(12) United States Patent
Guo et al.

(10) Patent No.: US 9,742,131 B2
(45) Date of Patent: Aug. 22, 2017

(54) POWER TRANSFER SYSTEMS

(71) Applicant: O2Micro Inc., Santa Clara, CA (US)

(72) Inventors: Guoyong Guo, San Jose, CA (US);
Shiqiang Yang, Sichuan (CN);
Zhanpeng Yang, Sichuan (CN)

(73) Assignee: O2Micro, Inc., Santa Clara, CA (US)

( * ) Notice: Subject to any disclaimer, the term of this patent is extended or adjusted under 35 U.S.C. 154(b) by 212 days.

(21) Appl. No.: 14/734,964

(22) Filed: Jun. 9, 2015

(65) Prior Publication Data

US 2016/0365805 A1    Dec. 15, 2016

(51) Int. Cl.
*G06F 1/26*    (2006.01)
*H01R 24/60*    (2011.01)

(52) U.S. Cl.
CPC .............. *H01R 24/60* (2013.01); *G06F 1/26* (2013.01)

(58) Field of Classification Search
CPC .................................. H01R 24/60; G06F 1/26
See application file for complete search history.

(56) References Cited

U.S. PATENT DOCUMENTS

| | | | | |
|---|---|---|---|---|
| 6,031,702 A * | 2/2000 | Williams | ............. | H02H 7/1213 361/101 |
| 7,615,965 B2 * | 11/2009 | Popescu-Stanesti | ...... | H02J 1/08 307/46 |
| 8,519,686 B2 * | 8/2013 | Rozman | ............... | H03K 17/122 323/234 |
| 8,541,981 B2 * | 9/2013 | Zhang | .................... | H02J 7/0021 320/134 |
| 8,686,662 B1 * | 4/2014 | Bragg | ..................... | H02J 7/345 315/159 |
| 2007/0268726 A1 * | 11/2007 | Kojori | ....................... | H02J 1/10 363/65 |
| 2011/0156483 A1 * | 6/2011 | Caraghiorghiopol | ... | G06F 1/263 307/66 |
| 2012/0117409 A1 * | 5/2012 | Lee | ........................... | G06F 1/26 713/340 |
| 2012/0313454 A1 * | 12/2012 | Montena | ................ | H01R 13/70 307/115 |
| 2013/0043829 A1 * | 2/2013 | Gurlahosur | ............. | H02J 7/045 320/107 |
| 2014/0140110 A1 * | 5/2014 | Portisch | ................ | H02M 5/458 363/34 |

OTHER PUBLICATIONS

Mark Hennessy, "A4 power amplifier," Dec. 31, 2014, pp. 1-12.*

* cited by examiner

*Primary Examiner* — Thienvu Tran
*Assistant Examiner* — Pinping Sun

(57) ABSTRACT

In a power transfer system, a first main switch can transfer power from a first connector to an output terminal. A first path can deliver a current from the first connector to the output terminal and control the current to be within a predefined ranger. A second main switch can transfer power from a second connector to the output terminal. A second path can deliver a current from the second connector to the output terminal and control the current to be within a predefined range. Control circuitry can turn off the second main switch and the second path and turn on the first path if the first power source is available at the first connector when the second power source is providing power to the output terminal. The control circuitry can turn on the first main switch when a time interval from turning on the first path has elapsed.

15 Claims, 9 Drawing Sheets

POWER TRANSFER SYSTEMS

BACKGROUND

FIG. 1 illustrates a conventional power transfer system 100 that selectively transfers power from an adapter connector 102A or a universal serial bus (USB) connector 102U to a load 108. More specifically, the system 100 includes a switch 106A coupled between the adapter connector 102A and the load 108, and a switch 106U coupled between the USB connector 102U and the load 108. If a USB power source 134U is plugged into the USB connector 102U and there is no adapter plugged into the adapter connector 102A, then the system 100 transfers power from the USB connector 102U to the load 108 by turning on the switch 106U and turning off the switch 106A. If an adapter 134A is plugged into the adapter connector 102A when the USB power source is powering the load 108, then the system 100 selects the adapter 134A to power the load 108 by turning on the switch 106A and turning off the switch 106U. The conventional power transfer system 100 has some shortcomings.

As shown in FIG. 1, each of the switches 106A and 106U includes a body diode having an anode coupled to the corresponding connector 102A or 102U and having a cathode coupled to a connection node 110 of a filter capacitor 104 and the load 108. When no power source is powering the load 108, the connection node 110 has a low voltage, e.g., zero volts. Thus, plugging a power source into the connector 102A or 102U may cause the body diode of the corresponding switch 106A or 106U to be turned on automatically, and there may be a voltage jump at the connection node 110 and a large transient current flowing through the corresponding switch 106A or 106U to charge the filter capacitor 104. This may cause damage to the corresponding switch 106A or 106U and the corresponding connector 102A or 102U.

Additionally, if a power source is plugged into the connector 102A or 102U, and the power source has a poor contact with the connector, then voltage spikes and/or current spikes may appear at the connection node 110, which may also cause damage to the system 100.

Furthermore, a voltage output from an adapter may be greater than a voltage output from a USB power source. If an adapter 134A having a higher output voltage is plugged into the adapter connector 102A when a USB power source 134U having a lower output voltage is powering the load 108 through the USB connector 102U, then it may cause a voltage jump at the connection node 110. The voltage jump can be relatively large if a difference between the output voltages of the adapter 134A and the USB power source 134U is relatively large, which may also cause damage to the system 100.

SUMMARY

In a power transfer system embodiment, a first main switch can transfer power from a first connector to an output terminal if a first power source is available at the first connector. A first path can deliver a first current from the first connector to the output terminal and control the first current to be within a first predefined range if the first power source is available at the first connector. A second main switch can transfer power from a second connector to the output terminal if a second power source is available at the second connector. A second path can deliver a second current from the second connector to the output terminal and control the second current to be within a second predefined range if the second power source is available at the second connector. Control circuitry can turn off the second main switch and the second path and turn on the first path if the control circuitry detects that the first power source is available at the first connector when the second power source is providing power to the output terminal through the second connector. The control circuitry can turn on the first main switch when a predetermined time interval from turning on the first path has elapsed.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Figure 1:
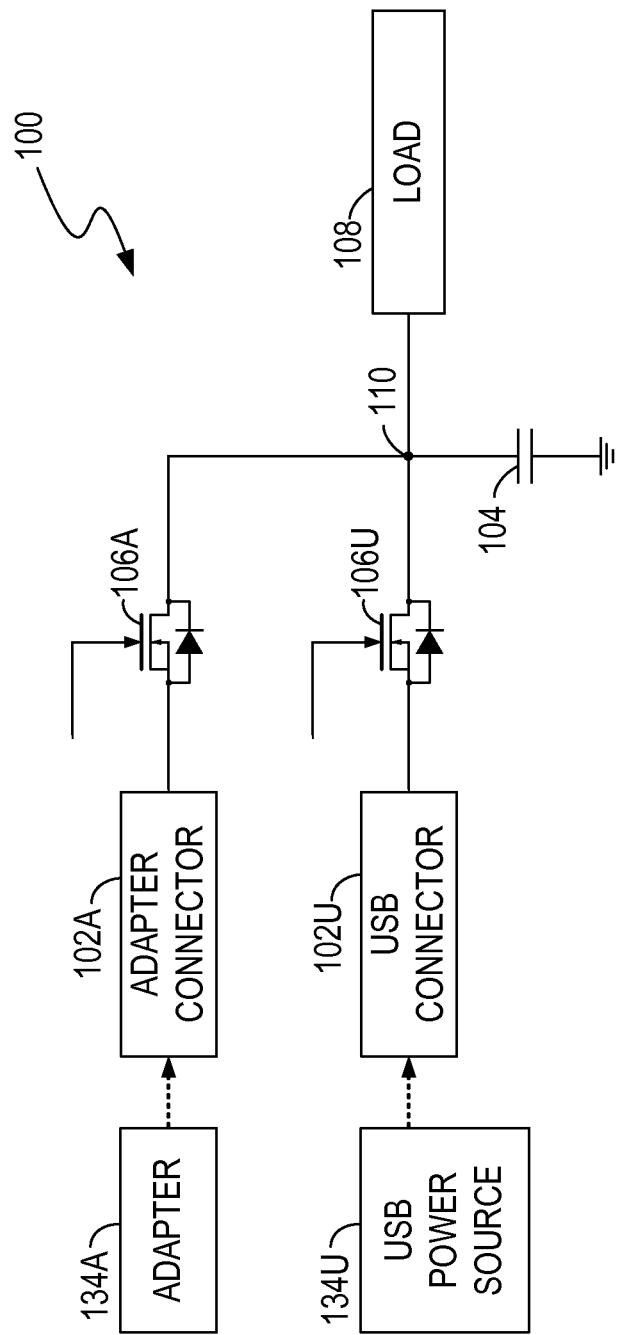
FIG. 1 illustrates a conventional power transfer system for transferring power.

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "controlling," "allowing," "selecting," "turning on," "turning off," "detecting," "starting to count time," "generating," "maintaining," "enabling," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data and includes any information delivery media. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

In an embodiment, the present invention provides a power transfer system that includes two or more power transfer modules. Each power transfer module can be used to transfer power from a power source to a load, e.g., including electronic components and/or circuits that consume power and/or including a rechargeable battery that stores power. By controlling the power transfer modules, the power transfer system can switch a source that powers the load between the power sources.

Figure 2:
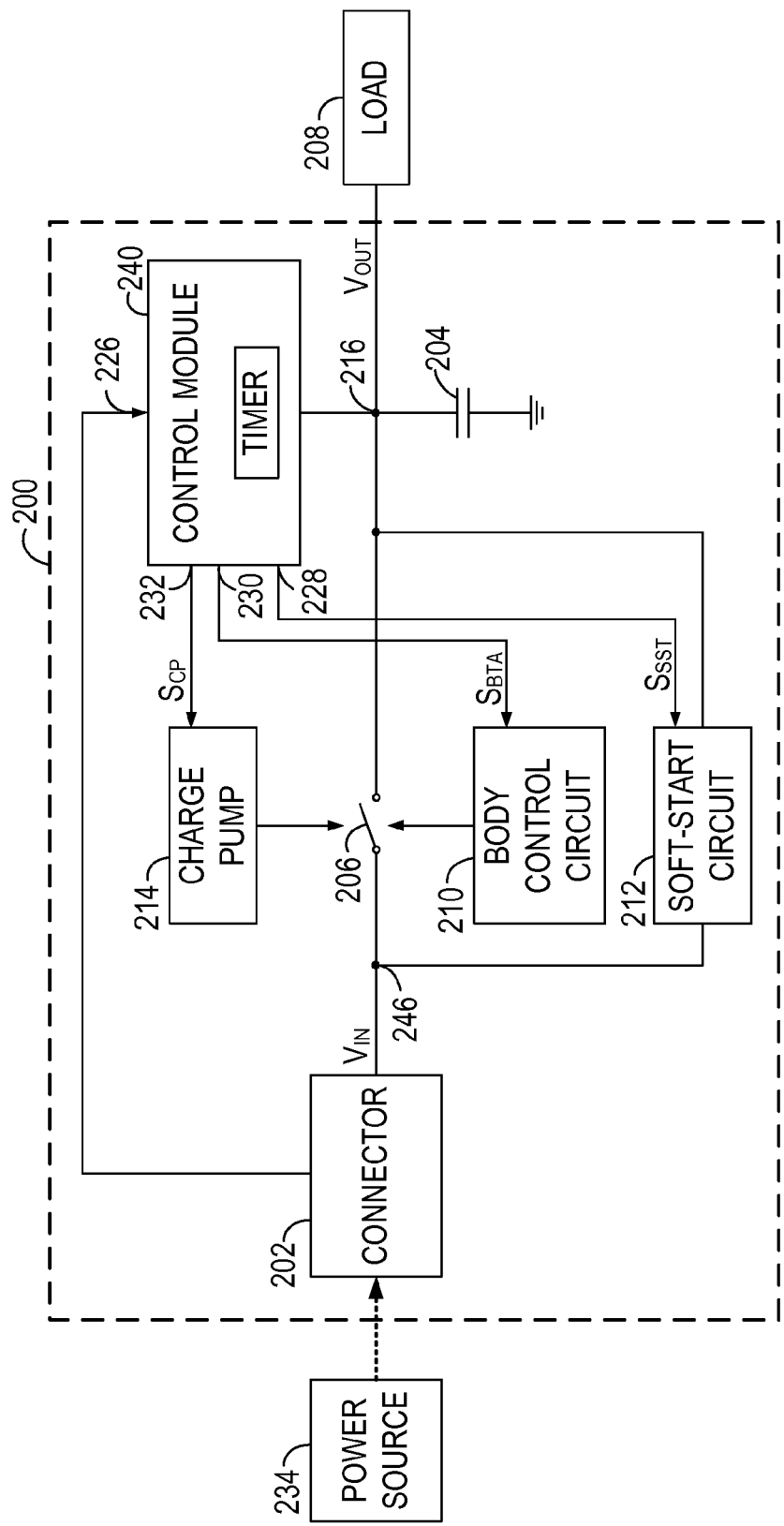
FIG. 2 illustrates a block diagram of an example of a power transfer module, in an embodiment according to the present invention.

FIG. 2 illustrates a block diagram of an example of a power transfer module 200, in an embodiment according to the present invention. In one embodiment, when a power source 234 is connected to (e.g., plugged into) a connector 202 such as a power input socket, a data communication socket, or the like of the power transfer module 200, the power transfer module 200 can transfer power from the power source 234 to a load 208 coupled to an output terminal 216 of the power transfer module 200.

In one embodiment, the power transfer module 200 includes the connector 202, a main switch 206 coupled between the connector 202 and the output terminal 216, and a soft-start circuit 212 coupled between the connector 202 and the output terminal 216. In one embodiment, the main switch 206 includes an N-channel metal-oxide semiconductor field-effect transistor (hereinafter, NMOS), and therefore the power transfer module 200 can also include a charge pump 214 to drive the NMOS 206. In an alternative embodiment, the main switch 206 includes a P-channel metal-oxide semiconductor field-effect transistor (hereinafter, PMOS), and the charge pump 214 disclosed in FIG. 2 can be omitted. As shown in FIG. 2, the power transfer module 200 includes a body control circuit 210 coupled to the main switch 206. A control module 240 of the power transfer module 200 includes control terminals 228, 230 and 232 coupled to the soft-start circuit 212, the body control circuit 210, and the main switch 206 (e.g., through the charge pump 214) respectively, and a power input terminal coupled to the output terminal 216 of the power transfer module 200. The power transfer module 200 can also include a filter capacitor 204 coupled between the output terminal 216 and reference ground GND.

In one embodiment, the connector 202 includes a universal serial bus (USB) connector compatible with a USB power source. The "USB power source" as mentioned herein can be a USB cable/connector coupled with an alternating-current to direct-current (AC to DC) buck converter (e.g., an adapter), a USB cable/connector coupled with a power bank, a USB cable/connector coupled with a computer, or a USB cable/connector coupled with another alike device that provides power. In another embodiment, the connector 202 includes an adapter connector compatible with an adapter power source. The "adapter power source" as mentioned herein can be a non-USB power cable coupled with an adapter.

In one embodiment, when the power source 234 is plugged into the connector 202, the control module 240 can generate control signals $S_{CP}$ and $S_{BTA}$ to control the charge pump 214 and the body control circuit 210 such that the main switch 206 remains off for a predefined time interval. For example, the control module 240 can include a timer to start counting time when the control module 240 detects that the power source 234 is plugged into the connector 202. During the predefined time interval, the soft-start circuit 212 can deliver a current from the power source 234 to charge the filter capacitor 204, and can control the current to be within a predefined range. Thus, an output voltage $V_{OUT}$ at the output terminal 216 can increase smoothly. When the predefined time interval has elapsed, the output voltage $V_{OUT}$ can have increased to a voltage level close to an input voltage $V_{IN}$ at an input terminal 246 of the power transfer module 200, e.g., an output voltage of the power source 234, and the control module 240 can generate control signals $S_{CP}$ and $S_{BTA}$ to control the charge pump 214 and the body control circuit 210 such that the main switch 206 is turned on. When the main switch 206 is turned on, power can be transferred from the power source 234 to power the load 208. Advantageously, when the power source 234 is plugged into the connector 202, the main switch 206 can remain off, and the soft-start circuit 212 can deliver a current to the output terminal 216 and control, e.g., limit, the current to be within a predefined range. As a result, the output voltage $V_{OUT}$ can increase smoothly. The voltage jump and large transient current mentioned in relation to the conventional power transfer system 100 can be avoided in the power transfer module 200. Elements in the power transfer module 200, e.g., including the connector 202, the main switch 206, etc., can be protected.

Figure 3A:
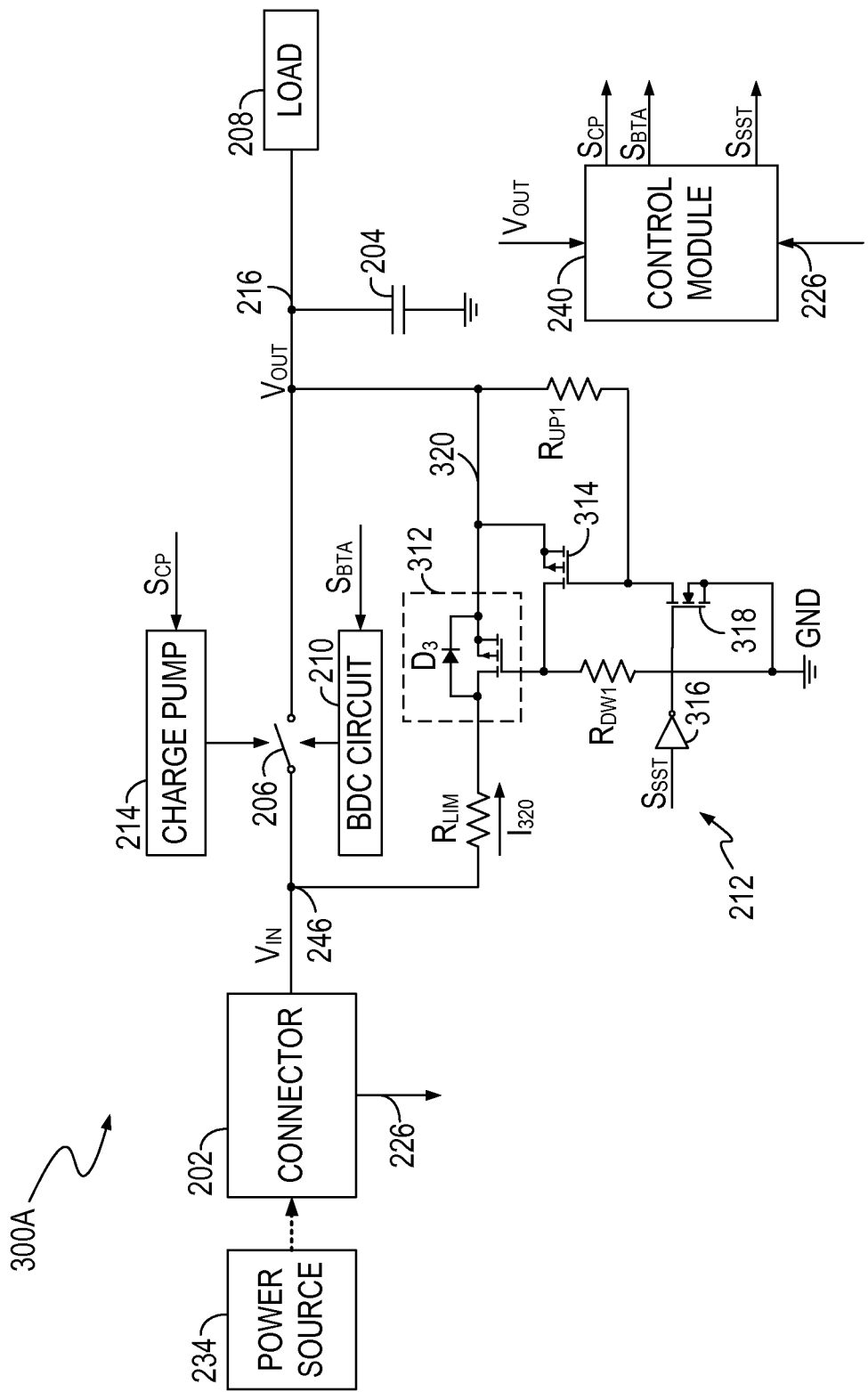
FIG. 3A illustrates a circuit diagram of an example of a power transfer module, in an embodiment according to the present invention.

FIG. 3A illustrates a circuit diagram of an example of a power transfer module 300A, in an embodiment according to the present invention. The power transfer module 300A can be an embodiment of the power transfer module 200 in FIG. 2. FIG. 3A is described in combination with FIG. 2.

As shown in FIG. 3A, the abovementioned soft-start circuit 212 can include a current limit component $R_{LIM}$ and a switch element 312 to form a current path 320. The current path 320 can deliver a current $I_{320}$ to the output terminal 216 when the main switch 206 is off, and the current limit component $R_{LIM}$ can control the current $I_{320}$ to be within a predefined range. For example, the current limit component $R_{LIM}$ includes a resistor, and the current $I_{320}$ flowing through the resistor can be less than $V_{IN}/R_{LIM}$, where $V_{IN}$ represents a voltage at the input terminal 246, and $R_{LIM}$ represents the resistance of the current limit component $R_{LIM}$. Additionally, the soft-start circuit 212 can include a pull-down resistor $R_{DW1}$, a pull-up resistor $R_{UP1}$, and switches 314 and 318.

In the example of FIG. 3A, the switch element 312 includes a PMOS, the switch 314 includes a PMOS, and the switch 318 includes an NMOS. The switch element 312 includes a drain terminal coupled to the current limit component $R_{LIM}$, a source terminal coupled to the output terminal 216, and a gate terminal coupled to the ground GND through the pull-down resistor $R_{DW1}$. The switch element 312 also includes a body diode $D_3$ having an anode coupled to the connector 202 through the current limit component $R_{LIM}$, and a cathode coupled to the output terminal 216. The switch 314 includes a drain terminal coupled to the gate terminal of the switch element 312, a source terminal coupled to the output terminal 216, and a gate terminal coupled to the ground GND through the switch 318 and coupled to the output terminal 216 through the pull-up resistor $R_{UP1}$.

In one embodiment, the soft-start circuit 212 may also include a logic inverter 316 configured to receive a soft-start control signal $S_{SST}$ from the control module 240 to control the switch 318, so as to control the switch element 312 and the current path 320. By way of example, if the control signal $S_{SST}$ is logic-low, then the logic inverter 316 outputs a logic-high signal to turn on the switch 318 (e.g., an NMOS). The turned-on switch 318 connects the gate terminal of the switch 314 (e.g., a PMOS) to the ground GND, which causes the switch 314 to be turned on. The turned-on switch 314 connects the gate terminal of the switch element 312 (e.g., a PMOS) to the source terminal of the switch element 312. Thus, the switch element 312 is turned off, and the current path 320 is turned off. If the control signal $S_{SST}$ is logic-high, then the logic inverter 316 outputs a logic-low signal to turn off the switch 318 (e.g., an NMOS). A voltage at the gate terminal of the switch 314 (e.g., a PMOS) is pulled up to be logic-high (e.g., close to the output voltage $V_{OUT}$) by the pull-up resistor $R_{UP1}$, which causes the switch 314 to be turned off. A voltage at the gate terminal of the switch element 312 (e.g., a PMOS) is pulled down to be logic-low (e.g., close to zero volts) by the pull-down resistor $R_{DW1}$. Thus, the switch element 312 is turned on, and the current path 320 is turned on.

Figure 3B:
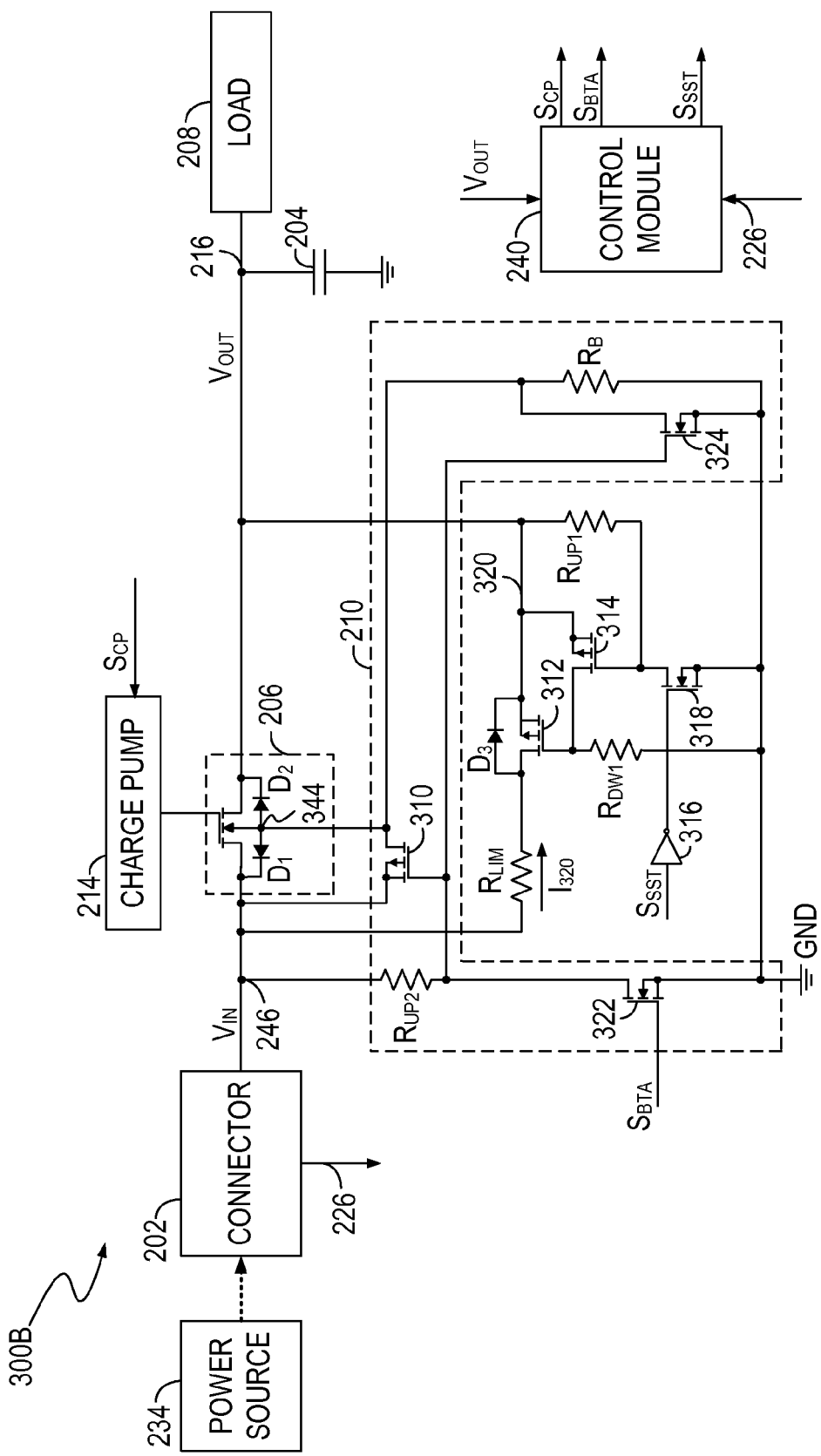
FIG. 3B illustrates a circuit diagram of an example of a power transfer module, in an embodiment according to the present invention.

FIG. 3B illustrates a circuit diagram of an example of a power transfer module 300B, in an embodiment according to the present invention. The power transfer module 300B can be an embodiment of the power transfer module 200 in FIG. 2. FIG. 3B is similar to FIG. 3A except that FIG. 3B also discloses examples of circuits diagrams of the main switch 206 and the body control circuit 210. FIG. 3B is described in combination with FIG. 2 and FIG. 3A.

In one embodiment, the main switch 206 includes an NMOS having a first body diode $D_1$ and a second body diode $D_2$. The first body diode $D_1$ is coupled between the connector 202 and a body terminal 344, e.g., in a body (substrate, bulk), of the main switch 206. The second body diode $D_2$ is coupled between the body terminal 344 and the output terminal 216. In one embodiment, the body control circuit 210 includes a body control switch 310, switches 322 and 324, a pull-up resistor $R_{UP2}$, and a bias resistor $R_B$. The body control switch 310 can include a PMOS having a source terminal coupled to the connector 202 and a drain terminal coupled to the body terminal 344. The drain terminal of the body control switch 310 is also coupled to the ground GND through the parallel-coupled bias resistor $R_B$ and switch 324. The gate terminal of the body control switch 310 is coupled to the input terminal 246 through the pull-up resistor $R_{UP2}$, coupled to the ground GND through the switch 322, and coupled to the gate terminal of the switch 324.

In one embodiment, the body diodes $D_1$ and $D_2$ are oppositely-coupled in series, e.g., their anodes are coupled to the body terminal 344 as shown in FIG. 3B. If the body control switch 310 is turned off, then the body control switch 310 can function as an open circuit between the anode and cathode of the first body diode $D_1$. In this situation, both of the diodes $D_1$ and $D_2$ are cut off, and no current can flow through the diodes $D_1$ and $D_2$. In one embodiment, if a voltage at the body terminal 344 is independent from a voltage at a source terminal of the main switch 206 (e.g., the input voltage $V_{IN}$ at the input terminal 246 in the example of FIG. 3B), then a turn-on threshold voltage $V_{TH}$ of the main switch 206 may be influenced by a source-body voltage $V_{SB}$ of the main switch 206. The influence can be referred to as "body effect" or "substrate bias effect." By turning on the body control switch 310, the body control switch 310 can function as a short circuit between the anode and cathode of the first body diode $D_1$, and therefore the voltage at the body terminal 344 can be equal to the source voltage of the main switch 206 (e.g., the input voltage $V_{IN}$). Hence, the body effect can be avoided. In other words, in one embodiment, when both the body control switch 310 and the main switch 206 are turned off, no current can flow through the main switch 206. This is different from the switches 106A and 106U described in relation in FIG. 1 in which a current may flow through the body diode of the switch 106A or 106U when they are turned off. In addition, when the main switch 206 is turned on, the body control switch 310 can be turned on to avoid the abovementioned body effect.

In one embodiment, the control module 240 generates a body control signal $S_{BTA}$ to control the switch 322 thereby controlling the switch 310 to function as the abovementioned short circuit or open circuit. By way of example, if the control signal $S_{BTA}$ is logic-low, then the switch 322 (e.g., an NMOS) is turned off. A voltage at the gate terminal of the switch 324 (e.g., an NMOS) is pulled up to be logic-high (e.g., close to the input voltage $V_{IN}$) by the pull-up resistor $R_{UP2}$, which causes the switch 324 to be turned on. The turned-on switch 324 connects the drain terminal of the switch 310 to the ground GND. Additionally, the gate terminal of the switch 310 (e.g., a PMOS) is also pulled up to have a logic-high level by the pull-up resistor $R_{UP2}$. Hence, the switch 310 is turned off. If the control signal $S_{BTA}$ is logic-high, then the switch 322 (e.g., an NMOS) is turned on to connect the gate terminals of the switch 310 (e.g., a PMOS) and the switch 324 (e.g., an NMOS) to the ground GND. Thus, the switch 310 is turned on. The switch 324 is turned off, and the bias resistor $R_B$ provides a bias drain voltage to the switch 310. As a result, the control signal $S_{BTA}$ can turn off the switch 310 to function as an open circuit or turn on the switch 310 to function as a short circuit.

Figure 4:
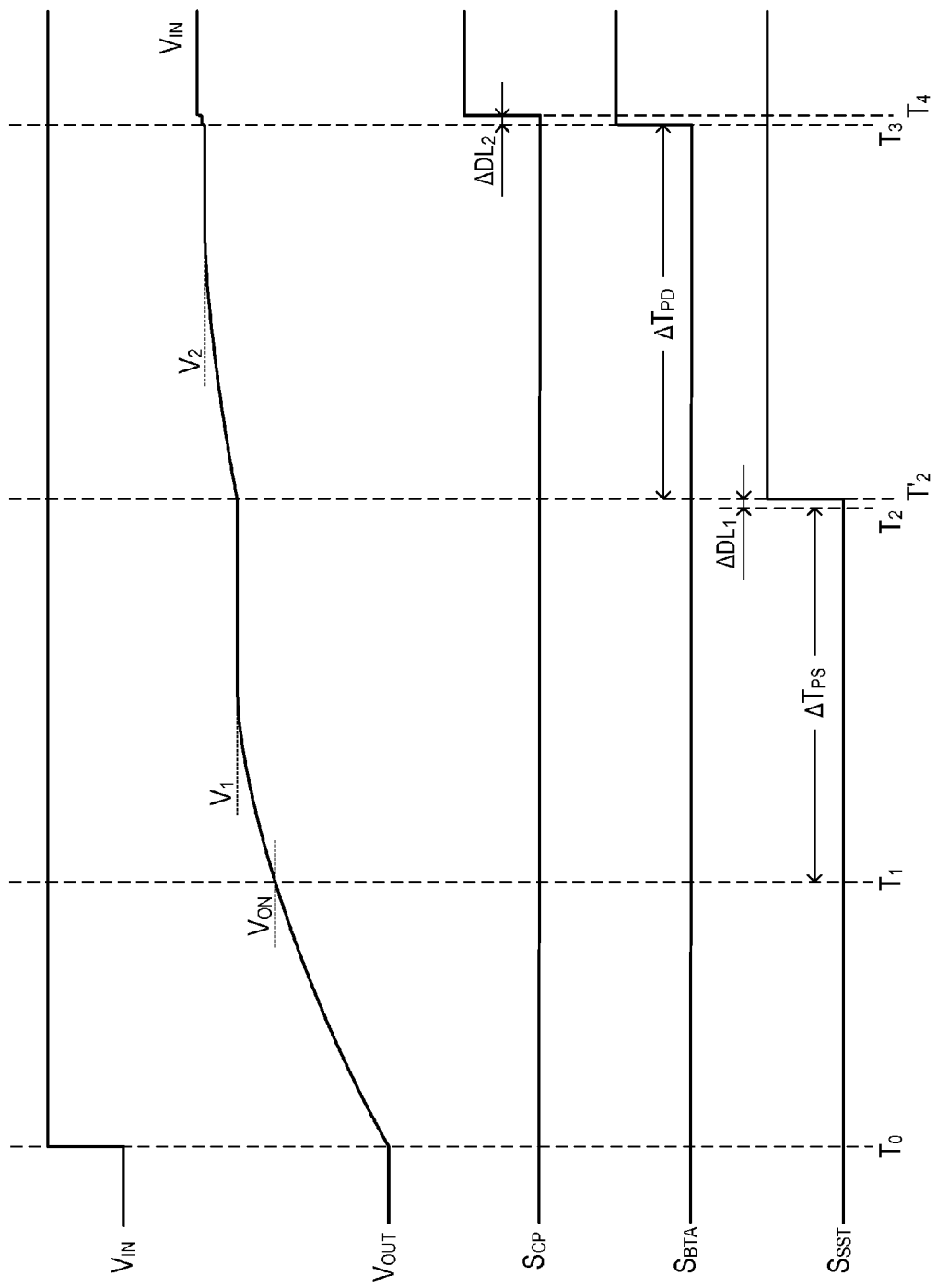
FIG. 4 illustrates examples of signal waveforms associated with a power transfer module, in an embodiment according to the present invention.

Examples of operations performed by the modules 200, 300A, and 300B are described in combination with FIG. 4. FIG. 4 illustrates examples of signal waveforms of an input voltage $V_{IN}$, an output voltage $V_{OUT}$, a charge pump control signal Sop, a body control signal $S_{BTA}$, and a soft-start control signal $S_{SST}$, associated with a power transfer module (e.g., 200, 300A, or 300B), in an embodiment according to the present invention.

Referring to FIG. 4, at time $T_0$, a power source 234 is plugged into the connector 202, and an input voltage $V_{IN}$ at the input terminal 246 increases to a voltage level determined by an output voltage of the power source 234. An output voltage $V_{OUT}$ of the output terminal 216 is at a low voltage level (e.g., zero volts). In one embodiment, the control module 240 is powered by the output voltage $V_{OUT}$ or a power supply voltage determined by (e.g., proportional to) the output voltage $V_{OUT}$. At time $T_0$, because the output voltage $V_{OUT}$ is at a low voltage level (e.g., zero volts), the control module 240 is not started up. The charge pump control signal $S_{CP}$, the body control signal $S_{BTA}$, and the soft-start control signal $S_{SST}$ are logic-low, and therefore the main switch 206, the body control switch 310, and the switch element 312 are turned off. The body diode $D_3$ of the switch element 312 is forward biased, e.g., turned on, because a voltage difference between the voltages $V_{IN}$ and $V_{OUT}$ is greater than the forward bias threshold of the diode $D_3$. Hence, a current $I_{320}$ is generated to flow through the body diode $D_3$ of the switch element 312 to charge the filter capacitor 204, and the output voltage $V_{OUT}$ increases. The current limit component $R_{LIM}$ controls the current $I_{320}$ to be within a predefined range, e.g., less than $V_{IN}/R_{LIM}$.

At time $T_1$, the output voltage $V_{OUT}$ has increased to a voltage threshold $V_{ON}$ that starts up the control module 240. After being started up, the control module 240 can detect whether a power source is connected to the connector 202. When detecting that the power source 234 is connected to the connector 202, the control module 240 starts to count time to determine whether a preset time interval $\Delta T_{PS}$ has elapsed. During the preset time interval $\Delta T_{PS}$ (e.g., from time $T_1$ to $T_2$) or at time $T_2$, the control module 240 can determine whether the power source 234 is available. In one embodiment, if the connector 202 receives a stable output voltage from the power source 234, and the output voltage of the power source 234 is within a specified range, e.g., from a first level $V_{MIN}$ to a second level $V_{MAX}$, then the power source 234 can be considered to be available. In other words, if the power source 234 has a poor contact with the connector 202, the output voltage of the power source 234 is less than the level $V_{MIN}$, or the output voltage of the power source 234 is greater than the level $V_{MAX}$, then the power source 234 can be considered to be unavailable. In one embodiment, the control module 240 can receive a signal 226, e.g., indicative of an output voltage of the power source 234 received at the connector 202, to determine whether the power source 234 is available. For example, the signal 226 can be, e.g., linearly, proportional to the output voltage. If the output voltage is outside the above mentioned specified range, then the signal 226 is outside a reference range. If the power source 234 has a poor contact with the connector 202, then the signal 226 may have voltage spikes. In another example, the signal 226 can indicate an average level of the output voltage, and if the power source 234 has a poor contact with the connector 202, then the signal 226 can have a voltage level less than the abovementioned level $V_{MIN}$. Thus, if the signal 226 has a stable voltage level and is within a reference range, then it indicates that the power source 234 is available, in one embodiment.

In one embodiment, if the power source 234 is available, then the control module 240 turns on the switch element 312 when a preset time interval, e.g., $\Delta T_{PS}$, has elapsed from the starting of counting time at, e.g., time $T_1$. On the other hand, if the power source 234 is unavailable, then the control module 240 can disconnect the power source 234 from the connector 202 and/or generate an alert signal to indicate the unavailability of the power source 234. Advantageously, the control module 240 detects whether the power source 234 is available before allowing the power source 234 to power the load 208 (e.g., before turning on the main switch 206), and as a result, the power transfer module (e.g., 200, 300A, or 300B) can be protected from voltage spikes and/or over-voltage caused by a poor contact between the power source 234 and the connector 202.

In the example of FIG. 4, the control module 240 determines that the power source 234 is available at time $T_2$, and sets the soft-start control signal $S_{SST}$ to be logic-high to turn on the switch element 312 at time $T'_2$. The function or usage of the delay $\Delta DL_1$ from time $T_2$ to time $T'_2$ will be described in combination with FIG. 5 and FIG. 6A.

In one embodiment, when the switch element 312 is turned on, the control module 240 can restart to count time. When a predetermined time interval $\Delta T_{PD}$ has elapsed (e.g., at time $T_3$) from turning on the switch element 312, the control module 240 sets the body control signal $S_{BTA}$ to be logic-high. Hence, the body control switch 310 is turned on to short circuit the anode and cathode of the first body diode $D_1$ of the main switch 206 at time $T_3$. The function or usage of the predetermined time interval $\Delta T_{PD}$ will be described in combination with FIG. 5 and FIG. 6A. Referring to FIG. 4, at time $T_4$, e.g., after a predetermined delay $\Delta DL_2$ from time $T_3$, the control module 240 sets the charge pump control signal $S_{CP}$ to be logic-high such that the charge pump 214 generates a voltage to turn on the main switch 206. The predetermined delay $\Delta DL_2$ can be used to ensure the first body diode $D_1$ is short-circuited before the main switch 206 is turned on. As such, the abovementioned body effect or substrate bias effect can be avoided. In other words, in one embodiment, before the main switch 206 is turned on, the body diodes $D_1$ and $D_2$ of the main switch 206 are cut off and therefore no current can flow through the main switch 206. When the main switch 206 is turned on to allow the power source 234 to power the load 208, the first body diode $D_1$ is short-circuited to avoid body effect in the main switch 206.

Figure 5:
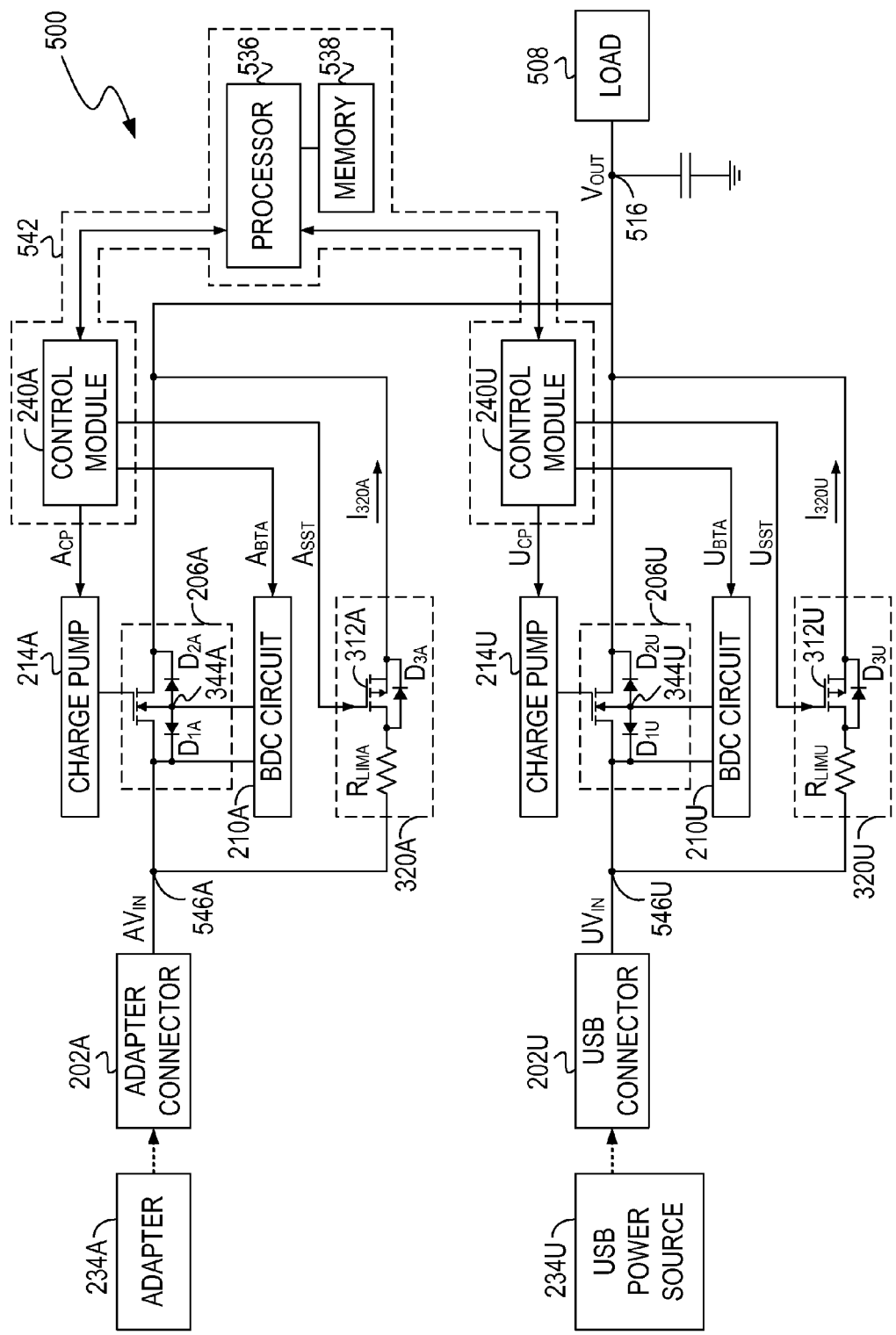
FIG. 5 illustrates a block diagram of an example of a power transfer system, in accordance with an embodiment of the present invention.

FIG. 5 illustrates a block diagram of an example of a power transfer system 500, in accordance with an embodiment of the present invention. FIG. 5 is described in combination with FIG. 2, FIG. 3A, FIG. 3B and FIG. 4.

In one embodiment, the power transfer system 500 can be included in an electronic device, e.g., a laptop, a tablet, a palmtop, a mobile phone, a mini speaker, a power bank, or the like, and can be used to transfer power from a power source to a load 508 in the electronic device. The load 508 can include system circuits in the electronic device and/or a rechargeable battery that powers the electronic device.

More specifically, in one embodiment, the power transfer system 500 includes a first power transfer module for a first kind of power source, e.g., an adapter power source, and a second power transfer module for a second kind of power source, e.g., a USB power source. Referring to FIG. 5, the first power transfer module includes a first connector 202A, e.g., an adapter connector, a first main switch 206A, a first path 320A, a first charge pump 214A, a first body control (BDC) circuit 210A, and a first control module 240A. The second power transfer module includes a second connector 202U, e.g., a USB connector, a second main switch 206U, a second path 320U, a second charge pump 214U, a second body control (BDC) circuit 210U, and a second control module 240U. Functions and/or circuit structures of the connectors 202A and 202U, the main switches 206A and 206U, the paths 320A and 320U, the charge pumps 214A and 214U, the body control circuits 210A and 210U, and the control modules 240A and 240U are similar to those of the abovementioned connector 202, main switch 206, current path 320, charge pump 214, body control circuit 210, and control module 240, respectively. In one embodiment, the first connector 202A is compatible with a first kind of power source 234A, e.g., an adapter power source, having a first maximum output power $P_{MAXA}$. The second connector 202U is compatible with a second kind of power source 234U, e.g., a USB power source, having a second maximum output power $P_{MAXU}$. The first maximum output power $P_{MAXA}$ is greater than the second maximum output power $P_{MAXU}$, and therefore the first kind of power source 234A, e.g., an adapter power source, has a higher priority than the second kind of power source 234U, e.g., a USB power source.

In one embodiment, the first path 320A is similar to the current path 320 in FIG. 3A or FIG. 3B. If a first power source 234A is available at the first connector 202A, then when the first main switch 206A is turned off, the first path 320A can deliver a first current $I_{320A}$ from the first connector 202A to an output terminal 516 of the power transfer system 500. The first path 320A can also control the first current $I_{320A}$ to be within a first predefined range. By way of example, the first path 320A includes a first switch element 312A operable for delivering the first current $I_{320A}$. The first path 320A also includes a first current limit component $R_{LIMA}$, e.g., a resistor, coupled in series to the first switch element 312A, and operable for controlling the first current $I_{320A}$ to be within the first predefined range, e.g., less than $AV_{IN}/R_{LIMA}$, where $AV_{IN}$ represents a voltage at a first input terminal 546A, and $R_{LIMA}$ represents a resistance value of the first current limit component $R_{LIMA}$. Additionally, similar to the switch element 312 in FIG. 3A or FIG. 3B, the first switch element 312A can include a body diode $D_{3A}$. If an available power source 234A is connected to the first connector 202A and there is no power source available at the second connector 202U, then when the first switch element 312A and the first main switch 206A are turned off, the body diode $D_{3A}$ of the first switch element 312A can deliver a first current $I_{320A}$ to the output terminal 516 to increase an output voltage $V_{OUT}$ at the output terminal 516.

In one embodiment, the first main switch 206A is similar to the main switch 206 in FIG. 2, FIG. 3A, or FIG. 3B. If a first power source 234A is available at the first connector 202A, then when the first main switch 206A is turned on, the first main switch 206A can transfer power from the first connector 202A to the output terminal 516. The first main switch 206A can include a body terminal 344A, a first body diode $D_{1A}$ coupled between the body terminal 344A and the first connector 202A, and a second body diode $D_{2A}$ coupled between the body terminal 344A and the output terminal 516. In one embodiment, the first body control circuit 210A includes a body control switch, e.g., similar to the body control switch 310 in FIG. 3B, to function as an open circuit or a short circuit between the anode and cathode of the first body diode $D_{1A}$ of the first main switch 206A.

In one embodiment, the second path 320U is similar to the current path 320 in FIG. 3A or FIG. 3B. If a second power source 234U is available at the second connector 202U, then when the second main switch 206U is turned off, the second path 320U can deliver a second current $I_{320U}$ from the second connector 202U to the output terminal 516. The second path 320U can also control the second current $I_{320U}$ to be within a second predefined range. By way of example, the second path 320U includes a second switch element 312U operable for delivering the second current $I_{320U}$. The second path 320U also includes a second current limit component $R_{LIMU}$, e.g., a resistor, coupled in series to the second switch element 312U, and operable for controlling the second current $I_{320U}$ to be within the second predefined range, e.g., less than $UV_{IN}/R_{LIMU}$, where $UV_{IN}$ represents a voltage at a second input terminal 546U, and $R_{LIMU}$ represents a resistance value of the second current limit component $R_{LIMU}$. Additionally, in one embodiment, similar to the switch element 312 in FIG. 3A or FIG. 3B, the second switch element 312U can include a body diode $D_{3U}$. If an available power source 234U is connected to the second connector 202U and there is no power source connected to the first connector 202A, then when the second switch element 312U and the second main switch 206U are turned off, the body diode $D_{3U}$ of the second switch element 312U can deliver a second current $I_{320U}$ to the output terminal 516 to increase an output voltage $V_{OUT}$ at the output terminal 516.

In one embodiment, the second main switch 206U is similar to the main switch 206 in FIG. 2, FIG. 3A, or FIG. 3B. If a second power source 234U is available at the second connector 202U, then when the second main switch 206U is turned on, the second main switch 206U can transfer power from the second connector 202U to the output terminal 516. The second main switch 206U can include a body terminal 344U, a first body diode $D_{1U}$ coupled between the body terminal 344U and the second connector 202U, and a second body diode $D_{2U}$ coupled between the body terminal 344U and the output terminal 516. In one embodiment, the second body control circuit 210U includes a body control switch, e.g., similar to the body control switch 310 in FIG. 3B, to function as an open circuit or a short circuit between the anode and cathode of the first body diode $D_{1U}$ of the second main switch 206U.

In one embodiment, the power transfer system 500 further includes a processor 536 and a memory 538. The processor 536 can be, but is not limited to, a micro processor, a micro controller, a central processing unit, or the like. The memory 538 is a non-transitory computer-readable storage medium, and can include/store computer-readable instructions that, when executed by the processor 536, cause the processor 536 to control the control modules 240A and 240U. Under the control of the processor 536, the control modules 240A and 240U can generate control signals $A_{CP}$, $A_{BTA}$, $A_{SST}$, $U_{CP}$, $U_{BTA}$ and $U_{SST}$ to control the circuits 206A, 210A, 320A, 206U, 210U, and 320U according to statuses of the first connector 202A and the second connector 202U. The statuses include whether a first power source 234A is available at the first connector 202A and/or whether a second power source 234U is available at the second connector 202U. For example, if a second power source 234U is available at the second connector 202U and there is no power source connected to the first connector 202A, then the second power transfer module is selected to transfer power to the load 508. In this example, the control signals $A_{CP}$, $A_{BTA}$ and $A_{SST}$ can inactivate the first power transfer module, e.g., by turning off the first main switch 206A and the first path 320A, and the control signals $U_{CP}$, $U_{BTA}$ and $U_{SST}$ can activate the second power transfer module, e.g., by turning on the second main switch 206U and/or the second path 320U. As another example, if a first power source 234A is available at the first connector 202A, then whether a second power source 234U is available at the second connector 202U or not, the first power transfer module is selected to transfer power to the load 508. The control signals $A_{CP}$, $A_{BTA}$ and $A_{SST}$ can activate the first power transfer module, e.g., by turning on the first main switch 206A and/or the first path 320A, and the control signals $U_{CP}$, $U_{BTA}$ and $U_{SST}$ can inactivate the second power transfer module, e.g., by turning off the second main switch 206U and the second path 320U. In one embodiment, the combined circuit of the control modules 240A and 240U, the processor 536, and the memory 538 constitute control circuitry 542. Although the control modules 240A and 240U disclosed in the example of FIG. 5 are external modules of the processor 536, the control modules 240A and 240U can be included in the processor 536 in another embodiment. In other words, the processor 536 can perform functions of the control modules 240A and 240U in another embodiment, and the control modules 240A and 240U can be omitted. The memory 538 can be an external memory of the processor 536 or integrated in the processor 536.

Although two power transfer modules are disclosed in FIG. 5, the invention is not so limited. In another embodiment, the power transfer system can include more than two power transfer modules.

Figure 6A:
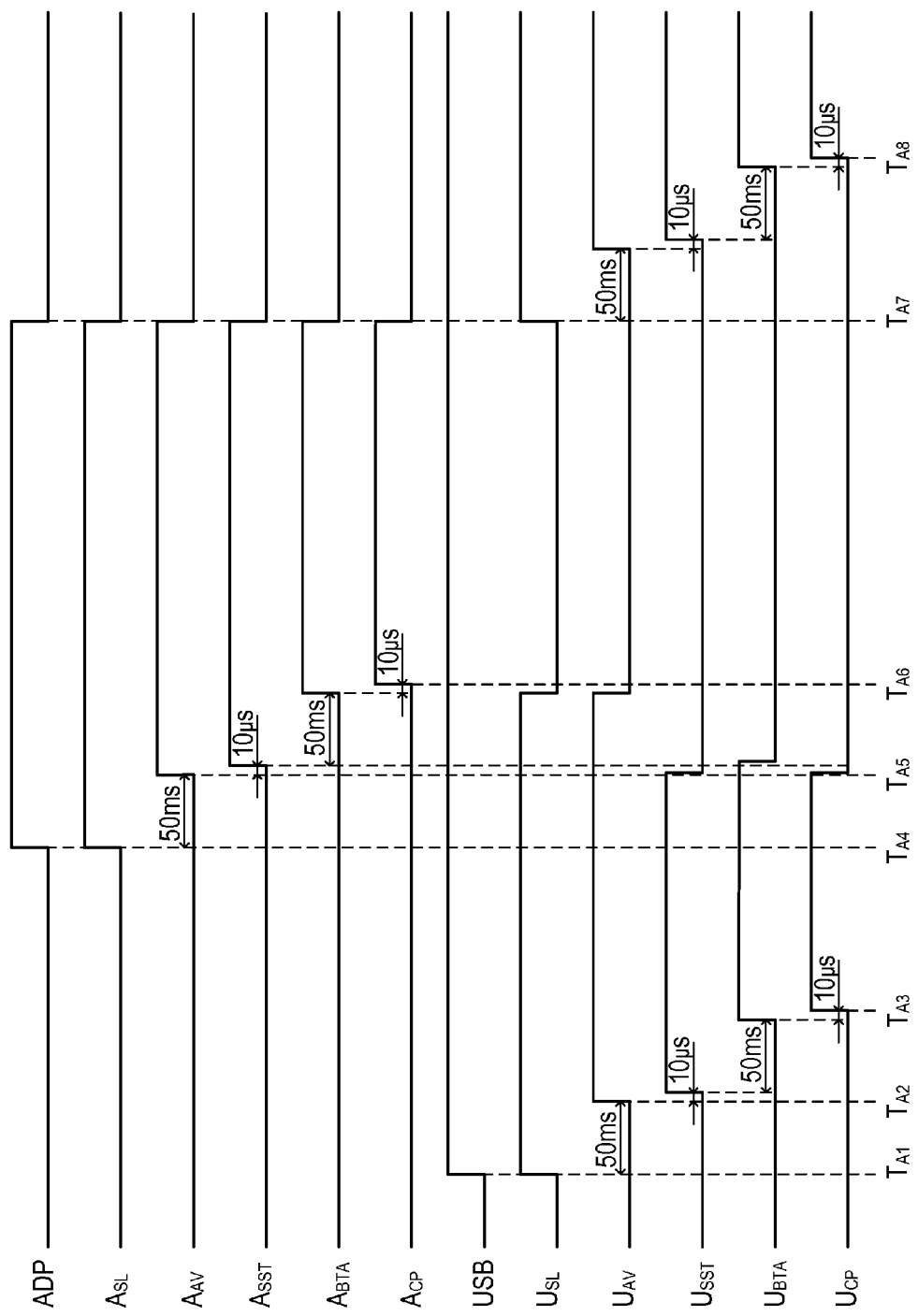
FIG. 6A illustrates a timing diagram of examples of signals associated with a power transfer system, in an embodiment according to the present invention.
Figure 6B:
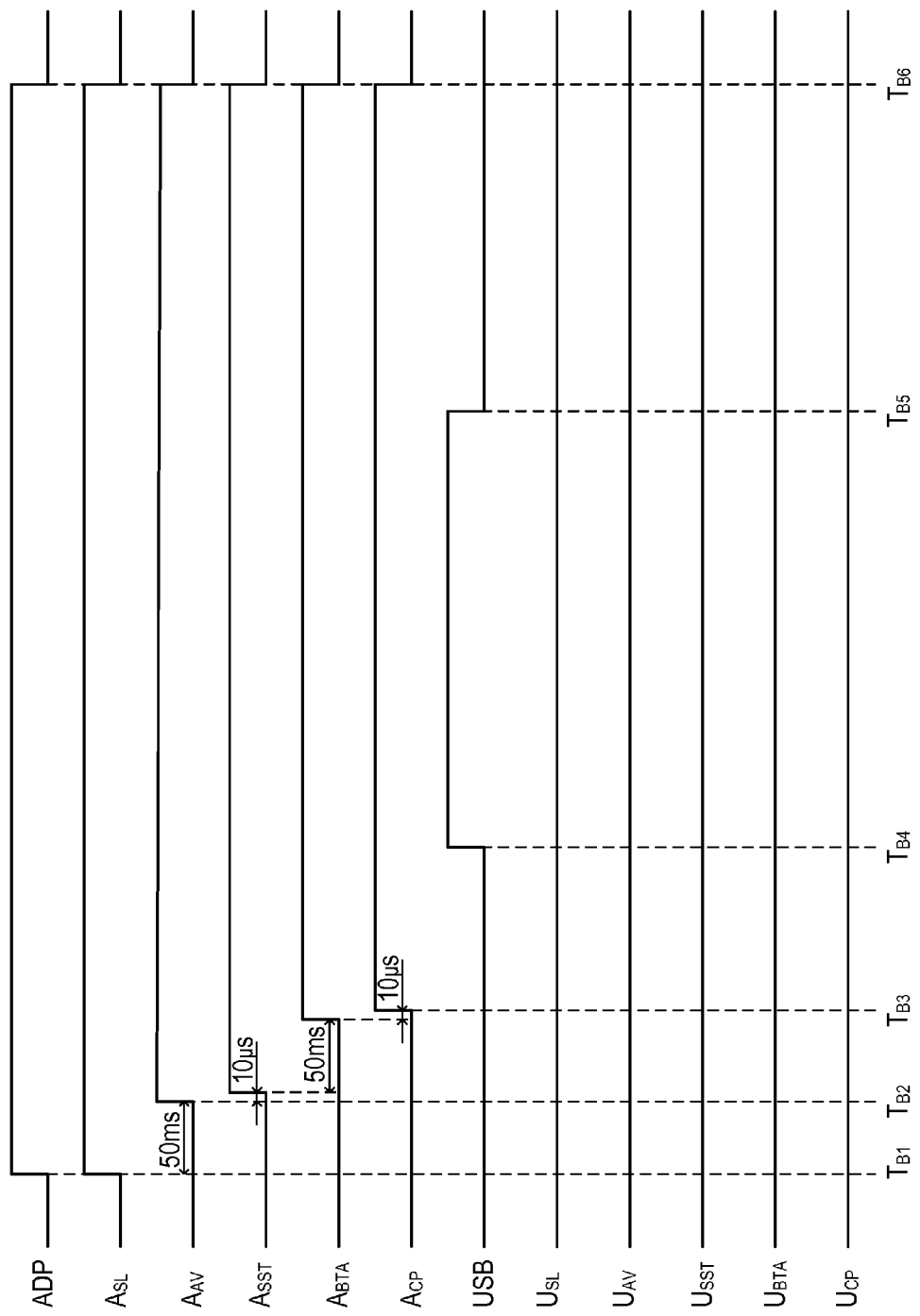
FIG. 6B illustrates a timing diagram of examples of signals associated with a power transfer system, in an embodiment according to the present invention.

Examples of operations performed by the power transfer system 500 are described in combination with FIG. 6A and FIG. 6B.

FIG. 6A illustrates a timing diagram of examples of signals ADP, $A_{SL}$, $A_{AV}$, $A_{SST}$, $A_{BTA}$, $A_{CP}$, USB, $U_{SL}$, $U_{AV}$, $U_{SST}$, $U_{BTA}$ and $U_{CP}$, associated with the power transfer system 500, in an embodiment according to the present invention. FIG. 6A is described in combination with FIG. 2, FIG. 3A, FIG. 3B, FIG. 4 and FIG. 5.

In the example of FIG. 6A, the indication signal ADP indicates a result of detecting whether a first power source 234A is connected to the first connector 202A. For example, a logic-high level of the signal ADP can indicate that a first power source 234A is connected to the first connector 202A, and a logic-low level of the signal ADP can indicate that no power source is connected to the first connector 202A. The selection signal $A_{SL}$ can indicate whether the first power transfer module is selected to transfer power to the load 508. For example, a logic-high level of the signal $A_{SL}$ can indicate that the first power transfer module is selected, and a logic-low level of the signal $A_{SL}$ can indicate that the first power transfer module is not selected. The indication signal $A_{AV}$ can indicate whether the first power source 234A is available or not. For example, a logic-high level of the signal $A_{AV}$ can indicate that the first power source 234A is available, and a logic-low level of the signal $A_{AV}$ may indicate that the first power source 234A is not available or that a result of detecting the availability of the first power source 234A has not been generated. The control signal $A_{SST}$ can control the first switch element 312A in a similar manner to that in which the soft-start control signal $S_{SST}$ controls the switch element 312, described in relation to FIG. 3A and FIG. 4. For example, a logic-high level of the control signal $A_{SST}$ can turn on the first switch element 312A, and a logic-low level of the control signal $A_{SST}$ can turn off the first switch element 312A. The control signal $A_{BTA}$ can control a body control switch in the first body control circuit 210A in a similar manner to that in which the body control signal $S_{BTA}$ controls the body control switch 310, described in relation to FIG. 3B and FIG. 4. For example, a logic-high level of the control signal $A_{BTA}$ can turn on the body control switch in the first body control circuit 210A, and a logic-low level of the control signal $A_{BTA}$ can turn off the body control switch in the first body control circuit 210A. The control signal $A_{CP}$ can control the first main switch 206A in a similar manner to that in which the charge pump control signal $S_{CP}$ controls the main switch 206, described in relation to FIG. 2, FIG. 3A, FIG. 3B and FIG. 4. For example, a logic-high level of the control signal $A_{CP}$ can turn on the first main switch 206A, and a logic-low level of the control signal $A_{CP}$ can turn off the first main switch 206A.

Similarly, the indication signal USB can indicate a result of detecting whether a second power source 234U is connected to the second connector 202U. For example, a logic-high level of the signal USB can indicate that a second power source 234U is connected to the second connector 202U, and a logic-low level of the signal USB can indicate that no power source is connected to the second connector 202U. The selection signal $U_{SL}$ can indicate whether the second power transfer module is selected to transfer power to the load 508. For example, a logic-high level of the signal $U_{SL}$ can indicate that the second power transfer module is selected, and a logic-low level of the signal $U_{SL}$ can indicate that the second power transfer module is not selected. The indication signal $U_{AV}$ can indicate whether the second power source 234U is available or not. For example, a logic-high level of the signal $U_{AV}$ can indicate that the second power source 234U is available, and a logic-low level of the signal $U_{AV}$ may indicate that the second power source 234U is not available or that a result of detecting the availability of the second power source 234U has not been generated. The control signal $U_{SST}$ can control the second switch element 312U in a similar manner to that in which the soft-start control signal $S_{SST}$ controls the switch element 312, described in relation to FIG. 3A and FIG. 4. For example, a logic-high level of the control signal $U_{SST}$ can turn on the second switch element 312U, and a logic-low level of the control signal $U_{SST}$ can turn off the second switch element 312U. The control signal $U_{BTA}$ can control a body control switch in the second body control circuit 210U in a similar manner to that in which the body control signal $S_{BTA}$ controls the body control switch 310, described in relation to FIG. 3B and FIG. 4. For example, a logic-high level of the control signal $U_{BTA}$ can turn on the body control switch in the second body control circuit 210U, and a logic-low level of the control signal $U_{BTA}$ can turn off the body control switch in the second body control circuit 210U. The control signal $U_{CP}$ can control the second main switch 206U in a similar manner to that in which the charge pump control signal $S_{CP}$ controls the main switch 206, described in relation to FIG. 2, FIG. 3A, FIG. 3B and FIG. 4. For example, a logic-high level of the control signal $U_{CP}$ can turn on the second main switch 206U, and a logic-low level of the control signal $U_{CP}$ can turn off the second main switch 206U.

In the example of FIG. 6A, during time $T_{A1}$ to time $T_{A7}$, the signals ADP, $A_{SL}$, $A_{AV}$, $A_{SST}$, $A_{BTA}$, $A_{CP}$, USB, $U_{SL}$, $U_{AV}$, $U_{SST}$, $U_{BTA}$ and $U_{CP}$ are generated in a situation where a first power source 234A is connected to, e.g., plugged into, the first connector 202A when a second power source 234U is providing power to the load 508. During time $T_{A7}$ to time $T_{A8}$, these signals are generated in a situation where the first power source 234A is disconnected, e.g., unplugged or removed, from the first connector 202A when the second power source 234U has been connected to the second connector 202U.

More specifically, at time $T_{A1}$, the second power source 234U is detected at the second connector 202U and no power source is detected at the first connector 202A. Hence, the control circuitry 542 sets the selection signal $U_{SL}$ to be logic-high and selects the second power transfer module to operate. The controlling of the second power transfer module during time $T_{A1}$ to time $T_{A3}$ is similar to the controlling of the power transfer module (e.g., 200, 300A, or 300B) described in relation to FIG. 4. The times $T_{A1}$, $T_{A2}$ and $T_{A3}$ in FIG. 6A can be corresponding to (e.g., can be examples of) the times $T_1$, $T_2$ and $T_4$ in FIG. 4, respectively. After time $T_{A3}$, the second main switch 206U is turned on, and the second power source 234U is providing power, through the second connector 202U and the second main switch 206U, to the load 508 at the output terminal 516.

In one embodiment, at time $T_{A4}$, a first power source 234A is detected at the first connector 202A. As mentioned above, the first power source 234A has a higher priority than the second power source 234U. Hence, the control circuitry 542 sets the selection signal $A_{SL}$ to be logic-high and selects the first power transfer module to operate. The control circuitry 542 determines whether the first power source 234A is available. If the control circuitry 542 detects that the first power source 234A is available at the first connector 202A, then during time $T_{A5}$ to time $T_{A6}$, the control circuitry 542 can switch the power source that powers the load 508 from the second power source 234U to the first power source 234A.

By way of example, when the first power source 234A is detected to be available at time $T_{A5}$, the control circuitry 542 sets the control signals $U_{SST}$ and $U_{CP}$ to be logic-low to turn off the second switch element 312U and the second main switch 206U. When the second switch element 312U and the second main switch 206U are off, the body diode $D_{2U}$ of the second main switch 206U can be turned on such that the load 508 still receives power from the second power source 234U. After turning off the second switch element 312U and the second main switch 206U, e.g., after a predetermined delay $\Delta DL_1$ (e.g., 10 μs) from time $T_{A5}$, the control circuitry 542 sets the control signal $A_{SST}$ to be logic-high to turn on the first switch element 312A. After turning on the first switch element 312A, the control circuitry 542 sets the control signal $U_{BTA}$ to be logic-low to turn off the body control switch in the second body control circuit 210U. Thus, both the body diodes $D_{1U}$ and $D_{2U}$ of the second main switch 206U are turned off, and the path that allows power to be transferred from the second power source 234U to the load 508 is cut off. Since the first switch element 312A has been turned on, the load 508 can receive power from the first power source 234A through the first path 320A. In one embodiment, the voltage $AV_{IN}$ at the first input terminal 546A provided by the first power source 234A may be greater than the voltage $UV_{IN}$ at the second input terminal 546U provided by the second power source 234U. If the second switch element 312U and/or the second main switch 206U remain turned on when the first switch element 312A is turned on, then there may be a boost-back current flowing from the output terminal 516 to the second input terminal 546U caused by the difference between the voltages $AV_{IN}$ and $UV_{IN}$. The predetermined delay $\Delta DL_1$ (e.g., 10 μs) can be used to ensure that the second switch element 312U and the second main switch 206U have been turned off when the first switch element 312A is turned on, which avoids the boost-back current.

When the first switch element 312A is turned on, the control circuitry 542 can restart to count time to determine whether a predetermined time interval $\Delta T_{PD}$ (e.g., 50 ms) has elapsed from turning on the first switch element 312A. In one embodiment, during the predetermined time interval $\Delta T_{PD}$, the first main switch 206A remains off, and the first body control circuit 210A maintains an open circuit between the body terminal 344A of the first main switch 206A and the first connector 202A. After the predetermined time interval $\Delta T_{PD}$ (e.g., 50 ms) has elapsed, the control signal $A_{BTA}$ is set to be logic-high such that the first body control circuit 210A enables a short circuit between the body terminal 344A and the first connector 202A. After enabling the short circuit, the control circuitry 542 can set the control signal $A_{CP}$ to be logic-high to turn on the first main switch 206A, e.g., at time $T_{A6}$.

In one embodiment, the voltage $AV_{IN}$ provided by the first power source 234A may be greater than the voltage $UV_{IN}$ provided by the second power source 234U. Thus, before turning on the first switch element 312A, there may be a difference between the voltage $AV_{IN}$ at the first input terminal 546A and the voltage $V_{OUT}$ at the output terminal 516, and the difference may not be small. Advantageously, the first main switch 206A can remain off during the predetermined time interval $\Delta T_{PD}$, and the first switch element 312A can be turned on to deliver a current $I_{320A}$ from the first power source 234A to increase the output voltage $V_{OUT}$. When the predetermined time interval $\Delta T_{PD}$ has elapsed, the output voltage $V_{OUT}$ can have increased to be relatively close to the voltage $AV_{IN}$. In other words, the difference between the output voltage $V_{OUT}$ and the voltage $AV_{IN}$ can be relatively small when the first main switch 206A is turned on. Thus, a voltage jump at the output terminal 516, caused by a difference between the voltages $AV_{IN}$ and $UV_{IN}$, can be avoided.

In one embodiment, at time $T_{A7}$, the first power source 234A is disconnected from the first connector 202A, and therefore the signals ADP, $A_{SL}$, $A_{AV}$, $A_{SST}$, $A_{BTA}$ and $A_{CP}$ become logic-low. In the example of FIG. 6A, the second power source 234U has been connected to the second connector 202U when the first power source 234A is disconnected from the first connector 202A. Thus, at time $T_{A7}$, the control circuitry 542 sets the selection signal $U_{SL}$ to be logic-high and selects the second power transfer module to operate again.

FIG. 6B illustrates a timing diagram of examples of the signals ADP, $A_{SL}$, $A_{AV}$, $A_{SST}$, $A_{BTA}$, $A_{CP}$, USB, $U_{SL}$, $U_{AV}$, $U_{SST}$, $U_{BTA}$ and $U_{CP}$, in another embodiment according to the present invention. These signals can have functions similar to those of the signals described in relation to FIG. 6A. In the example of FIG. 6B, during time $T_{B1}$ to time $T_{B5}$, the signals ADP, $A_{SL}$, $A_{AV}$, $A_{SST}$, $A_{BTA}$, $A_{CP}$, USB, $U_{SL}$, $U_{AV}$, $U_{SST}$, $U_{BTA}$ and $U_{CP}$ are generated in a situation where a second power source 234U is connected to the second connector 202U when a first power source 234A is providing power to the load 508. During time $T_{B5}$ to time $T_{B6}$, these signals are generated in a situation where the second power source 234U is disconnected from the second connector 202U when the first power source 234A has been connected to the first connector 202A.

As shown in FIG. 6B, at time $T_{B1}$, the first power source 234A is detected at the first connector 202A. Hence, the control circuitry 542 sets the selection signal $A_{SL}$ to be logic-high and selects the first power transfer module to operate. The controlling of the first power transfer module during time $T_{B1}$ to time $T_{B3}$ is similar to the controlling of the power transfer module (e.g., 200, 300A, or 300B) described in relation to FIG. 4. The times $T_{B1}$, $T_{B2}$ and $T_{B3}$ in FIG. 6B can be corresponding to (e.g., can be examples of) the times $T_1$, $T_2$ and $T_4$ in FIG. 4, respectively. After time $T_{B3}$, the first main switch 206A is turned on to transfer power from the first power source 234A to the load 508. At time $T_{B4}$, the second power source 234U is detected at the second connector 202U. At time $T_{B5}$, the second power source 234U is disconnected from the second connector 202U. Because the first power source 234A has a higher priority than the second power source 234U, the second power transfer module can remain inactivated during the time when the second power source 234U is connected to the second connector 202U, e.g., the signals $U_{SL}$, $U_{AV}$, $U_{SST}$, $U_{BTA}$ and $U_{CP}$ remain at logic-low during time $T_{B4}$ to time $T_{B5}$.

The time values 50 ms and 10 μs, disclosed in FIG. 6A and FIG. 6B, are examples of the abovementioned predetermined time interval $\Delta T_{PD}$, preset time interval $\Delta T_{PS}$, delay $\Delta DL_1$, and delay $\Delta DL_2$, and are only for illustration purpose. In another embodiment, the predetermined time interval $\Delta T_{PD}$, preset time interval $\Delta T_{PS}$, delay $\Delta DL_1$, and delay $\Delta DL_2$ can have other time values.

Figure 7:
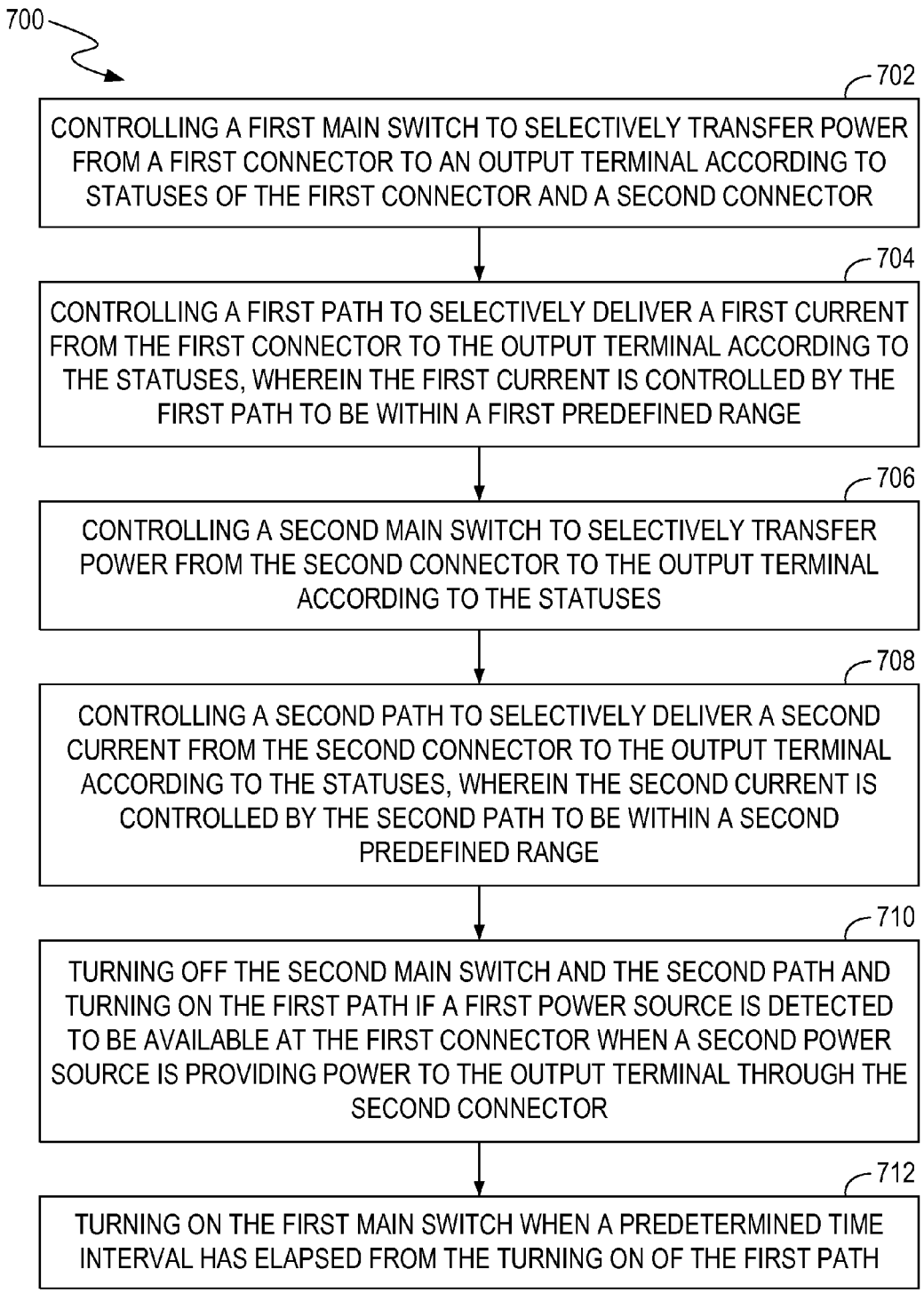
FIG. 7 illustrates a flowchart of examples of operations performed by a power transfer system, in an embodiment according to the present invention.

FIG. 7 illustrates a flowchart 700 of examples of operations performed by the power transfer system 500, in an embodiment according to the present invention. Although specific steps are disclosed in FIG. 7, such steps are examples. That is, the present invention is well suited to performing various other steps or variations of the steps recited in FIG. 7. In one embodiment, the flowchart 700 is implemented as a computer program, e.g., including computer-executable instructions, stored in a computer-readable medium, e.g., the memory 538. In other words, in one embodiment, when the processor 536 executes computer-readable instructions stored in the memory 538, the processor 536 can cause the power transfer system 500 to perform the operations in FIG. 7. FIG. 7 is described in combination with FIG. 2, FIG. 3A, FIG. 3B, FIG. 4, FIG. 5, FIG. 6A and FIG. 6B.

In block 702, the power transfer system 500 controls the first main switch 206A to selectively transfer power from the first connector 202A to the output terminal 516 according to statuses of the first connector 202A and the second connector 202U.

In block 704, the power transfer system 500 controls the first path 320A, e.g., by controlling the first switch element 312A, to selectively deliver a first current $I_{320A}$ from the first connector 202A to the output terminal 516 according to the statuses of the first connector 202A and the second connector 202U. The first current $I_{320A}$ is controlled by the first path 320A to be within a first predefined range, e.g., less than $AV_{IN}/R_{LIMA}$.

In block 706, the power transfer system 500 controls the second main switch 206U to selectively transfer power from the second connector 202U to the output terminal 516 according to the statuses of the first connector 202A and the second connector 202U.

In block 708, the power transfer system 500 controls the second path 320U e.g., by controlling the second switch element 312U, to selectively deliver a second current $I_{320U}$ from the second connector 202U to the output terminal 516 according to the statuses of the first connector 202A and the second connector 202U. The second current $I_{320U}$ is controlled by the second path 320U to be within a second predefined range, e.g., less than $UV_{IN}/R_{LIMU}$.

In block 710, the power transfer system 500 turns off the second main switch 206U and the second path 320U and turns on the first path 320A if a first power source 234A is detected to be available at the first connector 202A when a second power source 234U is providing power to the output terminal 516 through the second connector 202U.

In block 712, the power transfer system 500 turns on the first main switch 206A when a predetermined time interval $\Delta T_{PD}$ has elapsed from turning on the first path 320A.

In summary, embodiments according to the present invention provide power transfer systems. The power transfer system can select a power source from at least a first power source and a second power source to power a load. The power transfer system can include a first main switch and a first path for the first power source, and can include a second main switch and a second path for the second power source. In one embodiment, the first power source has a higher priority than the second power source. If the first power source is connected to the power transfer system when the second power source has been providing power to the load, then by controlling the first main switch, first path, second main switch, and second path, the power transfer system can switch the source that powers the load from the second power source to the first power source. Shortcomings described in relation to the conventional power transfer system 100 in FIG. 1 can be avoided. The present invention can be used in a device that includes two or more connectors, and that selectively receives power through one of the connectors from a power source corresponding to the connector. The device can include, but is not limited to, a laptop, a tablet, a palmtop, a mobile phone, a mini speaker, a power bank, and the like.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A system comprising:
   a first main switch operable for transferring power from a first connector to an output terminal if a first power source is available at said first connector;
   a first path operable for delivering a first current from said first connector to said output terminal and controlling said first current to be within a first predefined range if said first power source is available at said first connector;
   a second main switch operable for transferring power from a second connector to said output terminal if a second power source is available at said second connector;
   a second path operable for delivering a second current from said second connector to said output terminal and controlling said second current to be within a second predefined range if said second power source is available at said second connector; and control circuitry, coupled to said first and second main switches and said first and second paths, operable for turning off said second main switch and said second path and turning on said first path if said control circuitry detects that said first power source is available at said first connector when said second power source is providing power to said output terminal through said second connector, and operable for turning on said first main switch when a first predetermined time interval from said turning on said first path has elapsed, wherein said second path comprises a first switch element having a diode, wherein when said first switch element is turned off, said diode delivers said second current to said output terminal to increase an output voltage at said output terminal, wherein said control circuitry starts counting time when said output voltage increases to a voltage threshold, wherein said control circuitry determines whether said second power source is available, wherein if said second power source is available, then said control circuitry turns on said first switch element when a first preset time interval has elapsed from the start of said counting time, and wherein said control circuitry turns on said second main switch when a second predetermined time interval has elapsed from turning on said first switch element.

2. The system of claim 1, wherein said second path further comprises:
a current limit component, coupled to said first switch element, operable for controlling said second current to be within said second predefined range.

3. The system of claim 1, wherein said first path comprises:
a second switch element; and
a current limit component, coupled to said second switch element, operable for controlling said first current to be within said first predefined range.

4. The system of claim 3, wherein said control circuitry starts counting time in response to detecting that said first connector is connected to said first power source, wherein said control circuitry determines whether said first power source is available, and wherein if said first power source is available, then said control circuitry turns on said second switch element when a second preset time interval has elapsed from the start of said counting time that is started in response to said detecting that said first connector is connected to said first power source.

5. The system of claim 1, wherein said first main switch comprises a body terminal, a first body diode coupled between said body terminal and said first connector, and a second body diode coupled between said body terminal and said output terminal.

6. The system of claim 5, wherein said control circuitry further comprises:
a body control circuit operable for maintaining an open circuit between said body terminal and said first connector in said first predetermined time interval, and enabling a short circuit between said body terminal and said first connector after said first predetermined time interval has elapsed and before said turning on said first main switch.

7. The system of claim 1, wherein said first connector is compatible with a power source having a first maximum output power, and said second connector is compatible with a power source having a second maximum output power, and wherein said first maximum output power is greater than said second maximum output power.

8. A method comprising:
controlling a first main switch to selectively transfer power from a first connector to an output terminal according to statuses of said first connector and a second connector;
controlling a first path to selectively deliver a first current from said first connector to said output terminal according to said statuses, wherein said first current is controlled by said first path to be within a first predefined range;
controlling a second main switch to selectively transfer power from said second connector to said output terminal according to said statuses;
controlling a second path to selectively deliver a second current from said second connector to said output terminal according to said statuses, wherein said second current is controlled by said second path to be within a second predefined range, and wherein said second path comprises a first switch element having a diode;
turning off said second main switch and said second path and turning on said first path if a first power source is detected to be available at said first connector when a second power source is providing power to said output terminal through said second connector; and
turning on said first main switch when a first predetermined time interval from said turning on said first path has elapsed,
wherein said controlling said second path comprises:
delivering, using said diode, said second current to said output terminal to increase an output voltage at said output terminal when said first switch element is turned off;
starting to count time when said output voltage increases to a voltage threshold;
determining whether said second power source is available;
if said second power source is available, then turning on said first switch element when a first preset time interval has elapsed from said starting; and
turning on said second main switch when a second predetermined time interval has elapsed from said turning on said first switch element.

9. The method of claim 8, wherein said first path comprises a second switch element, and wherein said controlling said first path comprises:
starting to count time in response to detecting that said first connector is connected to said first power source;
determining whether said first power source is available; and
if said first power source is available, then turning said second switch element when a second preset time interval has elapsed from said starting to count time in response to said detecting.

10. The method of claim 8, wherein said first main switch comprises a body terminal, a first body diode coupled between said body terminal and said first connector, and a second body diode coupled between said body terminal and said output terminal, wherein said controlling said first main switch comprises:
maintaining an open circuit between said body terminal and said first connector in said first predetermined time interval; and enabling a short circuit between said body terminal and said first connector after said first predetermined time interval has elapsed and before said turning on said first main switch.

11. The method of claim 8, further comprising:
detecting whether a power source having a first maximum output power is available at said first connector; and
detecting whether a power source having a second maximum output power is available at said second connector, wherein said first maximum output power is greater than said second maximum output power.

12. A system comprising:
a processor; and
memory coupled to said processor, said memory comprising computer-readable instructions that, when executed by said processor, cause said system to perform a first plurality of operations, said first plurality of operations comprising:
controlling a first main switch to selectively transfer power from a first connector to an output terminal according to statuses of said first connector and a second connector;
controlling a first path to selectively deliver a first current from said first connector to said output terminal according to said statuses, wherein said first current is controlled to be within a first predefined range;
controlling a second main switch to selectively transfer power from said second connector to said output terminal according to said statuses;
controlling a second path to selectively deliver a second current from said second connector to said output terminal according to said statuses, wherein said second current is controlled to be within a second predefined range;
turning off said second main switch and said second path and turning on said first path if said system detects that a first power source is available at said first connector when a second power source is providing power to said output terminal through said second connector;
turning on said first main switch when a predetermined time interval from said turning on said first path has elapse;
maintaining an open circuit between a body terminal of said first main switch and said first connector in said predetermined time interval; and
enabling a short circuit between said body terminal and said first connector after said predetermined time interval has elapsed and before said turning on said first main switch, wherein said first main switch comprises a first body diode coupled between said body terminal and said first connector, and a second body diode coupled between said body terminal and said output terminal.

13. The system of claim 12, wherein said computer-readable instructions, when executed by said processor, also cause said system to perform a second plurality of operations, and wherein said second plurality of operations comprise:
starting to count time if said system detects that said second connector is connected to said second power source and no power is being provided at said first connector;
determining whether said second power source is available; and
if said second power source is available, then turning on a switch element in said second path when a preset time interval from said starting has elapsed.

14. The system of claim 12, wherein said computer-readable instructions, when executed by said processor, also cause said system to perform a second plurality of operations, and wherein said second plurality of operations comprise:
starting to count time if said system detects that said first connector is connected to said first power source when said second power source is providing power to said output terminal through said second connector;
determining whether said first power source is available; and
if said first power source is available, then turning on a switch element in said first path when a preset time interval from said starting has elapsed.

15. The system of claim 12, wherein said computer-readable instructions, when executed by said processor, also cause said system to detect whether a power source having a first maximum output power is available at said first connector, and to detect whether a power source having a second maximum output power is available at said second connector, and wherein said first maximum output power is greater than said second maximum output power.

* * * * *